(No Model.)
J. SHILLING, Jr.
POINT BAND AND CAP.
No. 451,337. Patented Apr. 28, 1891.
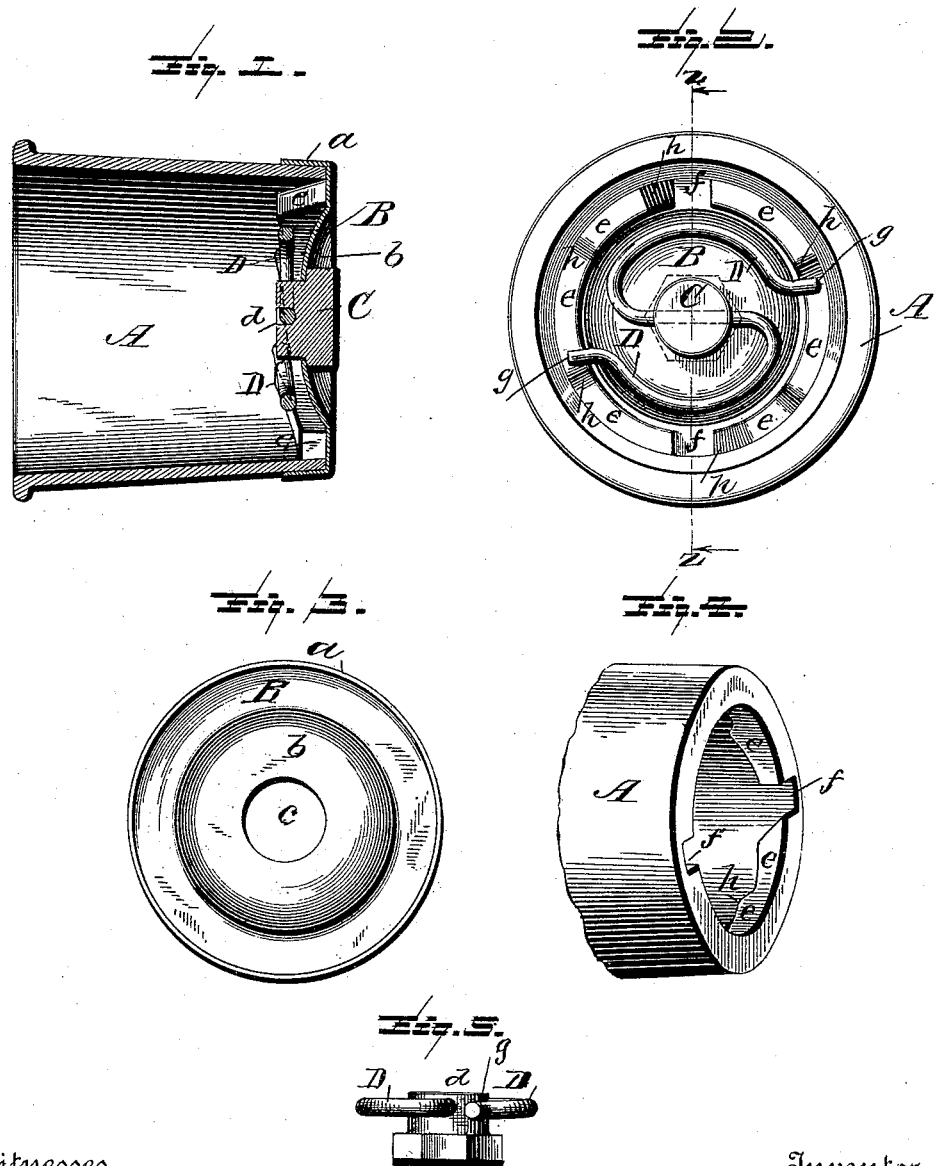

UNITED STATES PATENT OFFICE.

JESSE SHILLING, JR., OF TROY, OHIO.

POINT-BAND AND CAP.

SPECIFICATION forming part of Letters Patent No. 451,337, dated April 28, 1891.

Application filed December 8, 1890. Serial No. 373,982. (No model.)

*To all whom it may concern:*

Be it known that I, JESSE SHILLING, Jr., a citizen of the United States, residing at Troy, in the county of Miami and State of Ohio, have invented a new and useful Point-Band and Cap to be Used on the Hubs of Vehicle-Wheels, of which the following is a specification.

The present invention has for its object to provide a simple and easily-operating device for securely attaching the caps to point-bands which are designed for use on the hubs of vehicles, which device or means will possess both strength and durability and admit of the cap being readily connected or removed without injury thereto. These several objects I attain by the construction substantially as shown in the drawings, and hereinafter described and claimed.

Figure 1 of the drawings represents a central vertical section showing the cap in place on the point-band; Fig. 2, a view showing the interior of the point-band and cap with its connections; Fig. 3, a detail view of the cap with the nut removed; Fig. 4, a perspective view in detail of the smaller or outer end of the point-band; Fig. 5, a detail view of the nut with spring-arms attached.

In the accompanying drawings, A represents the point-band adapted to fit and be attached to the end of the hub, and to the outer or smaller end of the band is detachably connected the cap B, which may be of any suitable metal, as may also the band. This cap B is formed with an inwardly-extending flange a, which snugly fits over the outer periphery or exterior of the band A, thereby assisting in holding the cap in place as well as preventing the ingress of any dirt or other foreign substance to the interior of the hub. The cap is also formed with a concave bearing b, such concavity being to the extent of the thickness of the head of the nut C, so as to admit the outer side or extremity of the nut to come on the same plane with the cap, and yet admit of the nut being grasped by a wrench or other tool for the purpose of turning it. The cap B has a central opening c, through which extends the shank d of the nut C, and this shank has connected to it in any preferred and well-known manner suitable spring-arms D. These spring-arms in the present instance I have shown as formed of a single length of wire embedded in a groove in the shank of the nut and held therein by solder or by riveting or other well-known manner found best adapted to the purpose, and it is preferred to curve the arms, as shown, in order to distribute the tension over a greater distance and enable the arms to possess increased rigidity and at the same time retain the required elasticity.

The spring-arms when taken together form the letter S, and their ends or extremities are bent outward at an angle to the arms, as at g, so as to render them effective when acting in conjunction with the inclined shoulders or cams e upon the interior of the band A to hold the cap in place thereon. These cams or shoulders have rounded extremities, as shown at h, so that in operation the spring-arms can travel either way over the cams or shoulders to secure the cap to the band or remove it therefrom, the inclined face upon the cams or shoulders when the nut C is turned drawing the cap tightly against the edge of the band. Recesses f are formed between the cams or inclined shoulders e, which are diametrically opposite each other, and through which the ends g of the spring-arms D pass when connecting or withdrawing the cap from the band.

An important feature of the invention is in the nut turning independently of the cap to connect or disconnect said cap from the band, whereby any injury to the cap is avoided, as it remains stationary while the nut is being turned.

I wish it understood that any details of construction in the cap, cams, or inclined shoulders and spring-arms that would be considered coming within ordinary mechanical skill with regard to any change therein I reserve the right to make without departing from the principle of my invention.

The manner of attaching and removing the cap is accomplished very easily, and when secured in place it prevents all rattling of the parts and the joint made by the overlapping flange of the cap is proof against the admission of dirt, dust, and like foreign bodies. When connecting the cap to the band, the cap is placed over the same and the nut turned, so as to bring the extremities of the spring-arms on line with the recesses, when by turning the nut the ends of said arms will travel over the faces of the cams or inclined shoulders, which will draw the cap tightly in place over the end of the band without in any manner turning said cap. When removing the cap, all that is necessary is to turn the nut, so that the ends of the spring-arms will come in line with the recesses between the cams or inclined shoulders, when the cap may be readily removed. Any number of these cams or inclined shoulders may be used or their equivalent means for the spring-arms to engage, whereby the cap is secured in position on the band.

Having now fully described my invention, what I claim as new, and desire to secure by Letters Patent, is—

1. A cap and a nut connected thereto and adapted to turn independently thereof, and means for connecting the cap to a point-band, substantially as and for the purpose set forth.

2. The combination, with a point-band having suitable cams or shoulders upon its interior, of a cap, a nut connected thereto and adapted to turn independently thereof, and suitable arms upon the nut to engage with the cams or shoulders to hold the cap in place upon the point-band, substantially as and for the purpose described.

3. The combination, with a point-band having cams or shoulders upon its interior, of a cap having a nut connected thereto, and spring-arms extending from said nut to engage with the cams or shoulders, said nut adapted to turn independent of the cap, substantially as and for the purpose specified.

4. The combination, with a point-band having upon its interior cams or shoulders, of a cap, a nut connected thereto and adapted to turn independently thereof, and curved spring-arms connected to the nut and adapted to engage with the cams or shoulders, substantially as and for the purpose set forth.

5. A point-band having cams or shoulders and recesses, in combination with a cap having inwardly-extending flange to overlap the end of the band and a concave bearing-surface, a nut movably connected to the cap, and spring-arms connected to the nut, substantially as and for the purpose set forth.

6. A point-band having upon its interior suitable cams or shoulders and recesses diametrically opposite each other, in combination with a flanged and concave cap, a nut having a shank loosely passing through an opening in the cap, and spring-arms curved, as shown, and adapted to operate in connection with the cams or shoulders, substantially as and for the purpose described.

JESSE SHILLING, Jr.

Witnesses:
 W. W. EDGE,
 A. L. MCKINNEY.